United States Patent
Le Scouarnec et al.

(10) Patent No.: US 12,132,956 B2
(45) Date of Patent: Oct. 29, 2024

(54) METHOD AND APPARATUSES FOR SENDING AND RECEIVING A VIDEO

(71) Applicant: INTERDIGITAL MADISON PATENT HOLDINGS, SAS, Paris (FR)

(72) Inventors: Nicolas Le Scouarnec, Liffre (FR); Charline Taibi, Chartres de Bretagne (FR); Charles Salmon-Legagneur, Rennes (FR); Remi Houdaille, Cesson-Sevigne (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 76 days.

(21) Appl. No.: 17/768,637

(22) PCT Filed: Oct. 15, 2020

(86) PCT No.: PCT/EP2020/078989
§ 371 (c)(1),
(2) Date: Apr. 13, 2022

(87) PCT Pub. No.: WO2021/074269
PCT Pub. Date: Apr. 22, 2021

(65) Prior Publication Data
US 2023/0254533 A1    Aug. 10, 2023

(30) Foreign Application Priority Data

Oct. 15, 2019   (EP) ..................... 19315125

(51) Int. Cl.
*H04N 7/173*    (2011.01)
*H04N 21/2343*    (2011.01)
(Continued)

(52) U.S. Cl.
CPC ............. *H04N 21/440227* (2013.01); *H04N 21/234327* (2013.01); *H04N 21/2393* (2013.01); *H04N 21/2662* (2013.01); *H04N 21/8456* (2013.01)

(58) Field of Classification Search
CPC ... H04N 21/440227; H04N 21/234327; H04N 21/2393; H04N 21/2662; H04N 21/8456;
(Continued)

(56) References Cited

U.S. PATENT DOCUMENTS

| 6,292,512 | B1 | 9/2001 | Radha et al. |
| 2005/0117641 | A1 | 6/2005 | Xu et al. |

(Continued)

FOREIGN PATENT DOCUMENTS

| CN | 101053215 A | 10/2007 |
| CN | 102316313 A | 1/2012 |

(Continued)

OTHER PUBLICATIONS

Bentaleb et al., "A Survey on Bitrate Adaptation Schemes for Streaming Media Over HTTP", Institute of Electrical and Electronics Engineers, IEEE Communications Surveys & Tutorials, vol. 21, No. 1, Aug. 3, 2018, 25 pages.

(Continued)

*Primary Examiner* — Gigi L Dubasky
(74) *Attorney, Agent, or Firm* — Condo Roccia Koptiw LLP

(57) ABSTRACT

According to embodiments, an enhancement layer segment may be requested in addition to a base layer segment for a same video. The enhancement layer may be requested, in a low priority, so that the base layer may be delivered in priority. If the enhancement layer can be obtained by a deadline, a subsequent base layer segment may be requested at a higher quality (e.g., at a bitrate lower than or equal to (Continued)

the sum of the bitrates of the previously requested base layer and enhancement layer segments). If, for example, at a playback time, the enhancement layer segment is not obtained, it may be determined that the quality cannot be increased and subsequent requests for enhancement layer segments may be cancelled (e.g., not transmitted). According to embodiments, probing may repeat (e.g., any of immediately, regularly, periodically, . . . ) to detect available bandwidth variations.

20 Claims, 7 Drawing Sheets

(51) Int. Cl.
H04N 21/239 (2011.01)
H04N 21/2662 (2011.01)
H04N 21/4402 (2011.01)
H04N 21/845 (2011.01)

(58) Field of Classification Search
CPC ......... H04N 21/2402; H04N 21/26258; H04N 21/44209; H04N 21/4621; H04N 21/4825; H04N 21/262; H04N 21/482; H04N 21/845
See application file for complete search history.

(56) References Cited

U.S. PATENT DOCUMENTS

| | | | | |
|---|---|---|---|---|
| 2006/0087970 | A1* | 4/2006 | Vermeiren | H04N 21/6587 375/E7.013 |
| 2007/0121719 | A1* | 5/2007 | Van Der Schaar | H04N 21/234327 375/E7.181 |
| 2010/0158134 | A1* | 6/2010 | Yin | H04N 19/124 375/240.26 |
| 2011/0103445 | A1 | 5/2011 | Jax et al. | |
| 2012/0254455 | A1 | 10/2012 | Adimatyam et al. | |
| 2013/0013803 | A1 | 1/2013 | Bichot et al. | |
| 2013/0204973 | A1 | 8/2013 | Yie et al. | |
| 2013/0254418 | A1 | 9/2013 | Zhang | |
| 2014/0032719 | A1 | 1/2014 | Panwar | |
| 2014/0303984 | A1* | 10/2014 | Johnson | G10L 19/002 704/500 |
| 2017/0094279 | A1* | 3/2017 | Piramanayagam | G09G 5/10 |
| 2018/0007395 | A1 | 1/2018 | Ugur et al. | |
| 2018/0359297 | A1 | 12/2018 | Mihály et al. | |
| 2020/0128293 | A1* | 4/2020 | Mittal | H04N 21/845 |

FOREIGN PATENT DOCUMENTS

| | | | |
|---|---|---|---|
| CN | 102469072 A | 5/2012 | |
| CN | 102763450 A | 10/2012 | |
| CN | 103210642 A | 7/2013 | |
| CN | 108900518 A | 11/2018 | |
| EP | 2 034 736 A1 | 3/2009 | |
| EP | 2360923 A1 | 8/2011 | |
| EP | 2 408 205 A1 | 1/2012 | |
| EP | 3424216 A1 | 1/2019 | |
| GB | 2562243 A | 11/2018 | |
| KR | 20180024841 A | 3/2018 | |
| WO | WO-0002392 A2 * | 1/2000 | ............. H04N 19/34 |
| WO | 2006/048842 A1 | 5/2006 | |
| WO | 2006/080655 A1 | 8/2006 | |
| WO | 2017141001 A1 | 8/2017 | |
| WO | WO 2018029471 A1 | 2/2018 | |
| WO | 2018/115572 A2 | 6/2018 | |

OTHER PUBLICATIONS

Huysegems et al., "SVC-Based HTTP Adaptive Streaming", Alcatel-Lucent, Bell Labs Technical Journal., vol. 16, No. 4, Mar. 14, 2012, 17 pages.
English Translation for Korean Patent Application No. KR2018024841, entitled Streaming Service Server and Control Method Thereof, published Mar. 3, 2018, 29 pages.
ITU-T, , "Advanced Video Coding for Generic Audiovisual Services", Recommendation ITU-T H.264, Series H: Audiovisual and Multimedia Systems, Infrastructure of Audiovisual Services—Coding of Moving Video, Feb. 2014, 790 pages.
ITU-T, , "High Efficiency Video Coding", Recommendation ITU-T H.265, Series H: Audiovisual and Multimedia Systems, Infrastructure of Audiovisual Services—Coding of Moving Video, Oct. 2014, 540 pages.
Rivaz, et al., "AV1 Bitstream & Decoding Process Specification", The Alliance for Open Media, AC1 Bitstream Specification V 1.0.0, AOMediaCodec/ac1-spec project, Jun. 25, 2018, 677 pages.
Wen, et al., "Parallel Merge/Skip Mode for HEVC", JCTVC-G387, Hong Kong University of Science and Technology, Joint Collaborative Team on Video Coding (JCT-VC) of ITU-T SG16 WP3 and ISO/IEC JTC1/SC29/WG11, 7th Meeting: Geneva, CH, Nov. 21-30, 2011, pp. 1-13.
Huang et al., "Delay Adaptive Transmission Method for Scalable Video Streaming Based on OpenFlow", Journal on Communications, vol. 34, No. 11, Nov. 2013, pp. 121-128.

* cited by examiner

METHOD AND APPARATUSES FOR SENDING AND RECEIVING A VIDEO

CROSS REFERENCE TO RELATED APPLICATIONS

This application is a U.S. National Stage Application under 35 U.S.C. 371 of International Patent Application No. PCT/EP2020/078989, filed Oct. 15, 2020, which is incorporated herein by reference in its entirety.

This application claims the benefit of European Patent Application No. 19315125.5, filed Oct. 15, 2019, which is incorporated herein by reference in its entirety.

1. TECHNICAL FIELD

The present disclosure relates to the networking domain, particularly to adaptive streaming technologies applicable to video consumption on any kind of networks and devices.

2. BACKGROUND ART

Adaptive bitrate (ABR) streaming is a technique used in streaming multimedia over computer networks. ABR technologies, built upon Hyper-Text Transfer Protocol (HTTP) delivery, are growing in usage. They may support video consumption from rendering devices over any kind of (e.g., wireless, broadband) networks. ABR may be based on available network bandwidth and/or on player buffer levels. Low latency video applications, trying to keep buffers small may favour bandwidth based ABR rather than ABR based on buffer levels. Bandwidth based ABR may be based on bandwidth estimation for determining the (e.g., best) quality that can be downloaded over a given connection at a given time. Available bandwidth may be estimated, for example, by requesting a video segment and measuring the speed at which the video segment is downloaded. This may allow to probe (e.g., estimate) bandwidth beyond the video bitrate as video segments may be delivered in burst (i.e., as fast as possible) without consideration for the video bitrate. There may be situations where measuring the speed at which a video segment is downloaded may not allow to accurately estimate an available bandwidth. The video segments may, for example, be of small size. The video segment delivery may also be bounded by the encoder output rate, which may be constant, and may, for example, correspond to the requested quality. The present disclosure has been designed with the foregoing in mind.

3. SUMMARY

According to a first aspect, there is provided a method for receiving a video, the method comprising:
requesting a base layer segment encoded at a first base layer bitrate and an enhancement layer segment corresponding to a same temporal portion of the video, the enhancement layer segment being requested to be delivered at a lower priority than the base layer segment;
requesting a base layer subsequent segment of a subsequent portion of the video, the base layer subsequent segment being requested at a second base layer bitrate, higher than the first base layer bitrate, on a condition that the first enhancement layer segment is timely received (e.g., received in time to be (e.g., successfully) decoded and rendered).

According to a second aspect, there is provided an apparatus for receiving a video, the apparatus comprising a processor configured to:
request a base layer segment encoded at a first base layer bitrate and an enhancement layer segment corresponding to a same temporal portion of the video, at a lower priority than the base layer segment;
request a base layer subsequent segment of a subsequent portion of the video, the base layer subsequent segment being requested at a second base layer bitrate, higher than the first base layer bitrate, on a condition that the first enhancement layer segment is timely received (e.g., received in time to be (e.g., successfully) decoded and rendered) by the apparatus.

According to a third aspect, there is provided a method for transmitting a video, the method comprising:
receiving a request for a base layer segment encoded at a first base layer bitrate and for an enhancement layer segment encoded at an enhancement layer bitrate, the base layer segment and the enhancement layer segment corresponding to a same temporal portion of the video;
transmitting the base layer segment and the enhancement layer segment, the enhancement layer segment being transmitted at a lower priority than the base layer segment;
upon receiving a further request for a base layer subsequent segment of a subsequent portion of the video, transmitting the base layer subsequent segment encoded at a second base layer bitrate, lower than or equal to a sum of the first base layer bitrate and the enhancement layer bitrate.

According to a fourth aspect, there is provided an apparatus for transmitting a video, the apparatus comprising a processor configured to:
receive a request for a base layer segment encoded at a first base layer bitrate and for an enhancement layer segment encoded at an enhancement layer bitrate, the base layer segment and the enhancement layer segment corresponding to a same temporal portion of the video;
transmitting the base layer segment and the enhancement layer segment, the enhancement layer segment being transmitted at a lower priority than the base layer segment;
upon receiving a further request for a base layer subsequent segment of a subsequent portion of the video, transmitting the base layer subsequent segment encoded at a second base layer bitrate, lower than or equal to a sum of the first base layer bitrate and the enhancement layer bitrate.

4. BRIEF DESCRIPTION OF THE DRAWINGS

Figure 1:
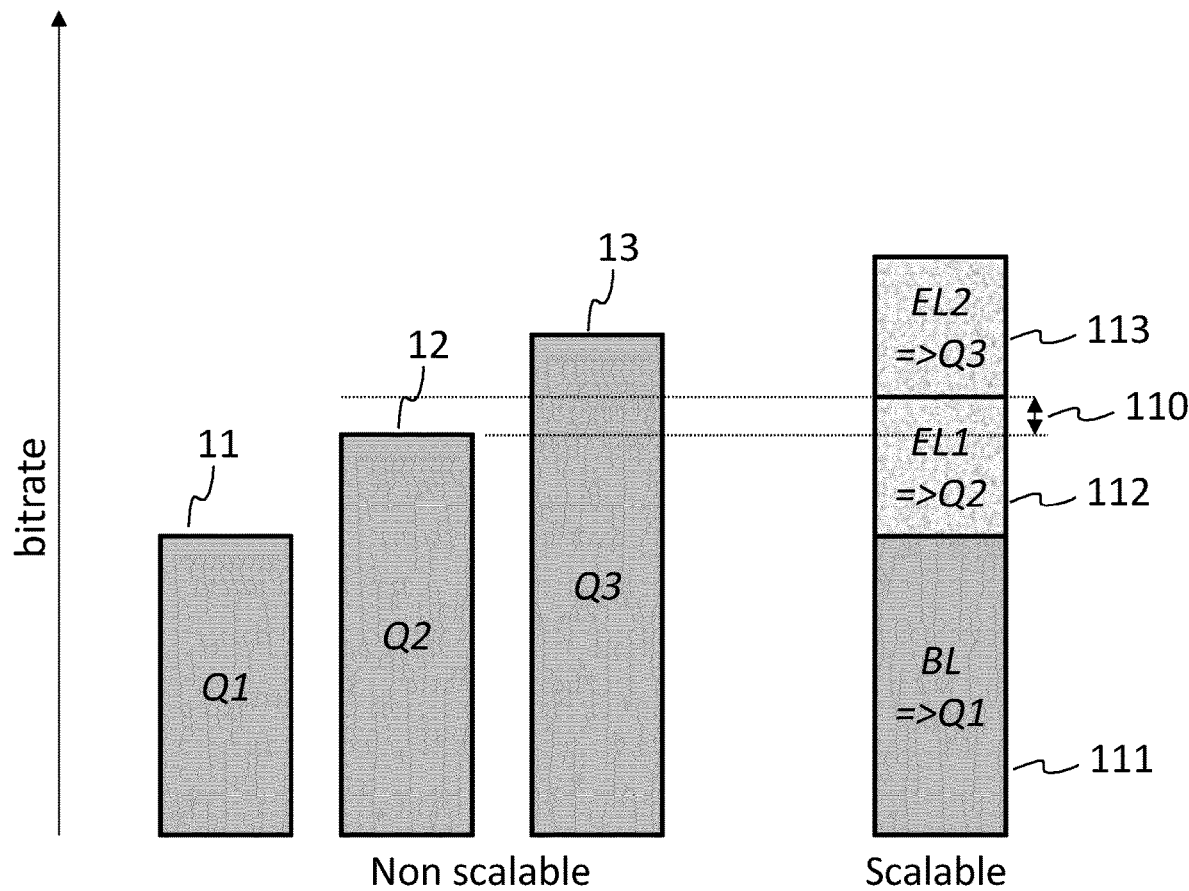
FIG. 1 illustrates an example of an overhead resulting from a scalable coding compared to a non-scalable coding, according to an embodiment.

It should be understood that the drawing(s) are for purposes of illustrating the concepts of the disclosure and are not necessarily the only possible configuration for illustrating the disclosure.

5. DESCRIPTION OF EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the term "interconnected" is defined to mean directly connected to or indirectly connected with through one or more intermediate components. Such intermediate components may include both hardware and software based components. The term "interconnected" is not limited to a wired interconnection and also includes wireless interconnection.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Embodiments described herein are related to ABR streaming of video content. ABR video streaming may be seen as a method of video streaming over HTTP where the source (e.g., video) content may be (e.g., video) encoded at multiple bitrates into respectively multiple streams, the different bitrate streams being segmented into (e.g., small) temporal video segments, a (e.g., each) segment being independently decodable. A streaming client (e.g., receiver) may be made aware of the availability of (e.g., segments of) streams at different bitrates, by a manifest file. When starting, the receiver may request the video segments, for example, from the lowest bitrate stream. If the receiver determines the download speed is greater than the (e.g., average) bitrate of the downloaded (e.g., last received) video segment(s), it may request subsequent segments with any of the next higher bitrates. If the receiver determines the download speed for a video segment is lower than the bitrate of the video segment, because, for example, the network throughput may have deteriorated, the receiver may request the next subsequent segment at a lower bitrate. The segment size may vary depending on a particular implementation or application. A video segment duration may be of any duration between, for example, two hundred milliseconds and ten 10 seconds. In a first example, ABR streaming may be according to the Moving Picture Expert Group (MPEG) Dynamic Adaptive Streaming over HTTP (DASH) standard. In a second example, ABR streaming may be according to the Adobe HTTP Dynamic Streaming. In a third example, ABR streaming may be according to the Apple HTTP Live Streaming method. In yet another example, ABR streaming may be according to Microsoft Smooth Streaming. Any ABR streaming technology is compatible with embodiments described herein.

According to embodiments, a bitrate at which a segment of video may be requested, may correspond to a bitrate at which the segment may be encoded.

Considering a hypothetical constant bitrate channel of bandwidth with the value of "bitrate" (e.g. in bits per second), if a (e.g., succession of segments of) video content is (e.g., continuously) delivered at this "bitrate", a receiver may be assured of having enough data for continuous (e.g., uninterrupted) playout on a condition that playout begins at least after an amount of data corresponding to a (e.g., given) time multiplied by bitrate bits have been received. The (e.g., given) time may, for example, be indicated (e.g., specified) in a received manifest (e.g., the playout may begin at a (e.g., given) time after the first bit is received). In other words, if a (e.g., set of) segment(s) of (e.g., encoded at) this bitrate is delivered over a hypothetical constant bit rate channel, the receiver may be assured of having enough data for a continuous playout, on a condition that playout begins after an amount of data has been received, this amount of data corresponding to a given time multiplied by the bitrate. According to embodiments, a bitrate of a segment may represent an amount of network bandwidth (e.g., bits per second) averaged, for example, on a given duration, which when provisioned in the network may allow (e.g., ensure) a stability of the buffer level of the receiver and/or no disruption in the video played out by the receiver.

Embodiments described herein are related to bandwidth based ABR techniques for receiving a video stream. In ABR streaming, a request for a video segment may be transmitted. After a round trip time (RTT) the requested video segment may be received at the available bandwidth. The term available bandwidth refers to the (e.g., download) network throughput being available to a receiver, such as for example and without limitation an amount of received data (e.g., any of bits, bytes and packets) over time. If the network connection is not saturated (e.g., congested), the download bandwidth may be higher than the (e.g., video encoded) bitrate. According to embodiments, the download may complete relatively early (e.g., relative to a play out time) and the receiver may pause (e.g., wait) before sending the next request (because, for example, the receiver buffers may be full). If the network connection is saturated (or close to saturation), the download bandwidth may be equal to (or close to) the (e.g., video encoded) bitrate, and the download may progress at a similar speed as the playback. According to embodiments, the next request may be sent (e.g., immediately) after, or before the end of the download to accommodate for the latency of the network (e.g., RTT).

According to embodiments, low latency applications may use short video segments (e.g., as short as two hundred milliseconds). Low latency applications may be, for example, any of live video streaming and fast start applications (e.g., wherein the time elapsing between requesting a content and playing back that content is reduced, for example to a low (e.g., minimum) value). Estimating an available bandwidth on receiving short video segments, by, for example, measuring a speed at which a segment of video is downloaded may provide inaccurate results. The video segment delivery may be bounded by the encoder output rate, which may be constant, and may, for example, correspond to the requested quality. The receiver, measuring a speed at which such video segments are downloaded may not be able to determine whether more bandwidth could be available for requesting a higher quality video segment.

According to embodiments, scalable video coding may be used together with different (e.g., network delivery) priorities. The combination of scalable coding wherein different (e.g., multiple) layers of video may be requested to be delivered using different (e.g., network) priorities may allow to obtain a better (e.g., the best) quality (e.g., with the highest available bitrate) for the content while mitigating possible video play out disruptions. The term priority refers to a level of importance allocated to a given segment for being delivered (e.g., transmitted) over the network. Different techniques may be used for providing different (e.g., network delivery, transmission) priorities, by prioritizing the transmission of some data over some other data. According to embodiments, a priority may be a delivery network (e.g., protocol) priority such as e.g., any of an HTTP2 priority, a Quick User Datagram Protocol Internet Connections (QUIC) priority, Differentiated Services (DiffServ) priority, a layer two priority (e.g., IEEE 802.1p), . . . .

According to embodiments, different segments may be requested (e.g., and delivered) with different priorities by sequentially requesting the different segments in a (e.g., given, prioritized) order e.g., using a single priority delivery network (e.g., protocol). The protocol may be, for example, HTTP/1.1. For example, a first segment (e.g., a base layer segment) may be requested first, and then a second segment (e.g., an enhancement layer) may be requested such that the transmission of the two segments may sequentially occur. For example, the time for requesting (e.g., sending the request for) the second (e.g., enhancement layer) segment may be such that the transmission of the second (e.g., enhancement layer) segment may start after the transmission of the first (e.g., base layer) segment may terminate. This may be referred to herein as request pipelining. For example, the first and second segments may be requested via HTTP1.1 which may be based on a single (e.g., TCP) connection e.g., to a server. Request pipelining, e.g., based on a single TCP connection, may allow to prioritize the delivery of the first requested segment over the second requested segment, by ensuring the server will sequentially transmit the first and the second segments in the requested order. In another example, the first segment (e.g., base layer segment) and the second segment (e.g., enhancement layer) may be requested via two different parallel (e.g., TCP) connections, wherein the second segment may be requested a given time after the first segment may have been requested. The given time may be chosen, such that the transmission of the second segment may start sometime after the transmission of the first segment started (e.g., possibly before but close to the completion of the first segment transmission). Any networking/transmission prioritization technique may be compatible with the embodiments disclosed herein.

Scalable video coding may be seen as a technique where video is coded in a base layer and any number of enhancement layers. If only the base layer is decoded, a first level of (e.g., basic) quality may be obtained. If an enhancement layer is decoded, (in addition to the base layer), an enhanced quality may be obtained. If several enhancement layers are decoded (together with a base layer), the obtained quality may be improved (e.g., enhanced) further. According to embodiments, obtaining an enhanced quality of a video may be any of improving (e.g., increasing) a signal to noise ratio, a resolution and a frame rate of the video. At equivalent bitrates, using scalable coding may reduce the quality of the video compared to the use of non-scalable coding as illustrated by FIG. 1. In a first example the scalable video coding technique may be according to the SVC standard (Annex G extension of the H264/MPEG-4 AVC video compression standard). In a second example, the scalable video coding technique may be according to the Scalable High Efficiency Video Coding (SHVC) standard, an extension of the H265/MPEG-HEVC standard. In yet another example, the scalable video coding technique may be according to any of VP9 and Scalable Video Technology for AV1 (SVT-AV1). Any scalable encoding technique where different layers or video may be encoded and transmitted independently from each other may be compatible with the embodiments described herein.

FIG. 1 illustrates an example of an overhead resulting from using a scalable coding compared to a non-scalable coding for targeting a same level of quality, according to an embodiment. For the sake of clarity, FIG. 1 is illustrated though the example of SVC/AVC as scalable and non-scalable video coding techniques. A piece of video may be encoded by a non-scalable video coding (e.g., AVC) at three different quality levels Q1, Q2, Q3, resulting in three video segments 11, 12, 13 corresponding to three different bitrates, the higher the quality, the higher the bitrate, as illustrated on FIG. 1. A same piece of video may be encoded with a scalable video coding (e.g., SVC) resulting in a base layer (BL) segment 111, and two enhancement layer (EL) segments 112, 113 respectively targeting the same quality levels Q1, Q2 and Q3 as the three AVC segments 11, 12, 13. The SVC encoded BL segment 111, (being an AVC segment) targeting the same quality level Q1 as the AVC encoded segment 11, corresponds to the same encoded bitrate as illustrated by FIG. 1. The SVC BL segment 111 combined with the first enhancement layer EL1 segment 112 targeting the same quality level Q2 as the AVC encoded segment 12, corresponds to a higher encoded bitrate than the AVC encoded segment 12. The difference between both bitrates represents the overhead 110 of a scalable encoded multi-layer video compared to a non-scalable encoded video for a same quality level. ABR streaming with (e.g., only) SVC encoded segments would result in a decreased quality compared to ABR streaming with (e.g., only) AVC encoded segments for a given network bandwidth, due to the SVC/AVC overhead.

Embodiments disclosed herein may allow probing the available network bandwidth beyond downloading a video segment, while improving the quality of the received content and the use of the available bandwidth without risking degrading the playout quality as the bandwidth is estimated.

According to embodiments, an enhancement layer segment may be requested in addition to a base layer segment for a same video. The enhancement layer may be requested, for example, in a low priority (e.g., any of HTTP2, QUIC, Diffserv, delayed request), so that the base layer may be delivered in priority. If the enhancement layer can be obtained by a deadline, a subsequent base layer segment may be requested at a higher quality (e.g., at a bitrate lower than or equal to the sum of the bitrates of the previously requested base layer and enhancement layer segments). If, for example, at a playback time, the enhancement layer segment is not obtained, it may be determined that the quality cannot be increased and subsequent requests for enhancement layer segments may be cancelled (e.g., not transmitted). According to embodiments, probing may repeat (e.g., any of immediately, regularly, periodically, . . . ) to detect available bandwidth variations.

Figure 2:
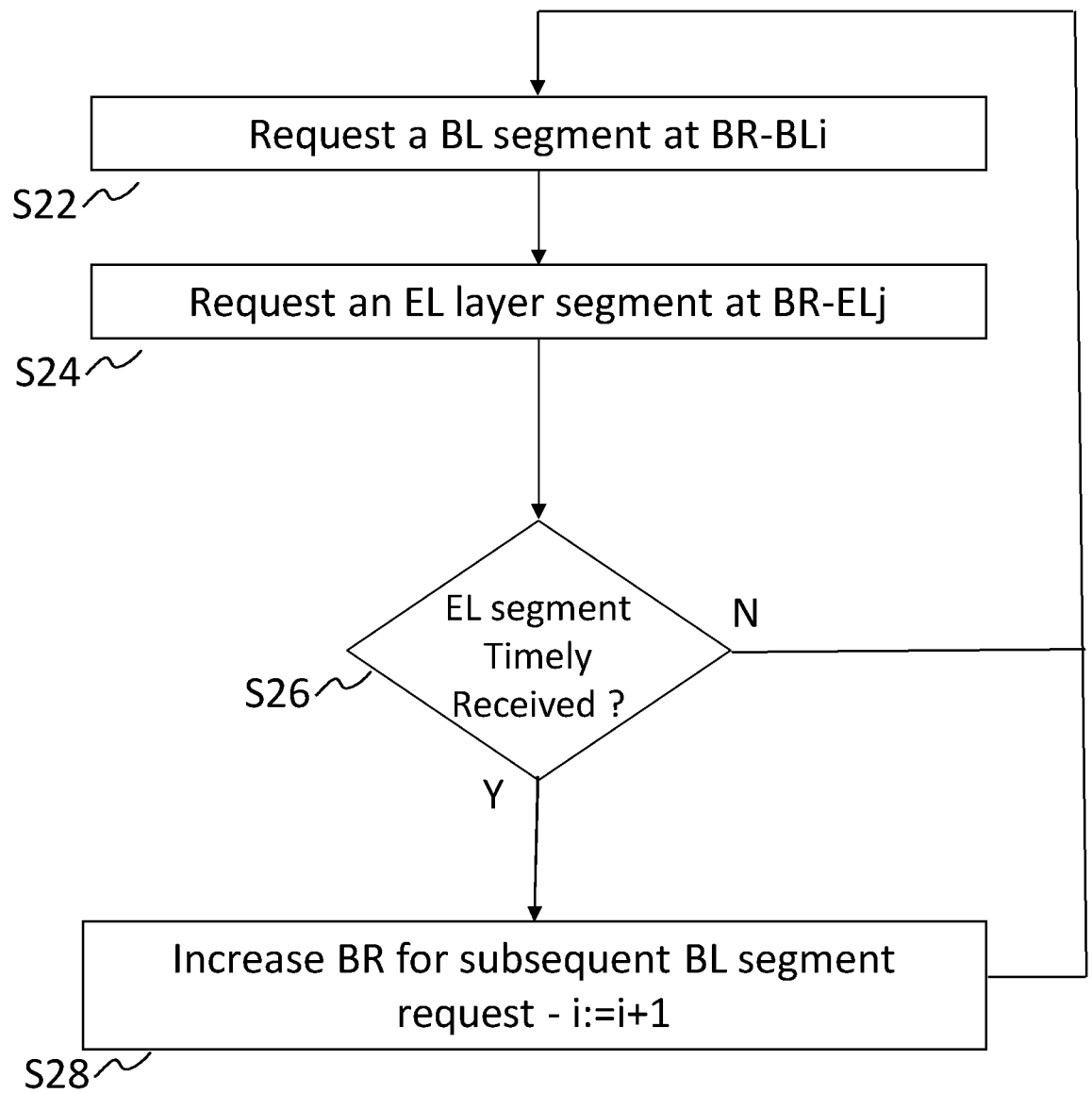
FIG. 2 depicts an example of a method for receiving a video according to an embodiment.

FIG. 2 depicts an example of a method for receiving a video according to an embodiment. In a step S22, a base layer (BL) segment of the video (e.g., encoded) at a first BL bitrate may be requested by a receiver apparatus towards an ABR transmitting apparatus, which may be referred to herein as an ABR server. For example, a request packet may be transmitted by the receiver to the ABR server for requesting a BL segment of the video (e.g., encoded) at a first BL bitrate. In a step S24, an enhancement layer (EL) segment of the video (e.g., encoded) at a first EL bitrate, corresponding to a same temporal portion as the requested BL segment, may be requested to the ABR server, to be delivered at a lower priority than the requested BL segment. For example, a request packet may be transmitted by the receiver to the ABR server for requesting an EL segment, corresponding to the same temporal portion of the video as the requested BL segment. The EL segment may be requested to be transmitted by the ABR server at a lower priority than the requested BL segment. According to embodiments, the request for the BL segment and the request for the EL segment may be transmitted by the receiver into a single request packets or different request packets. The step S24 of requesting an EL segment corresponding to the same temporal portion of the video may allow to probe the available bandwidth, beyond what may be used for receiving the BL segment. According to embodiments, a BL segment of the video may be requested without probing for available bandwidth (e.g., without requesting an EL segment corresponding to the same temporal portion of the video). Probing for available bandwidth may be done, for example, on a regular basis (e.g., based on any of a constant amount of time, a constant number of requested segments, etc.)

According to embodiments, the requested BL segment may be received (e.g., decoded and played out) by the receiver. Depending on the available bandwidth, the requested EL segment, being transmitted in a lower priority than the requested BL segment, may be timely received, for being decoded and successfully played out by the receiver, or may not be timely received (e.g., not entirely received before a given time related to a playout time of the EL/BL segment). For example, in a step S26 it may be determined whether the requested EL segment is timely received or not (e.g., entirely received before a given time). For example, a requested EL segment may be determined to be timely received on a condition that the requested EL segment was (e.g., totally) received at a time allowing the EL segment to be decoded (e.g. and presented/displayed) in accordance with the playout time (e.g., without creating any video playout disruption). For example, a requested EL segment may be determined to be timely received on a condition that the EL segment is received, decoded and ready for display at a time the BL segment may be displayed. For example, a requested EL segment may be determined to be timely received on a condition that a picture may be rendered (e.g., may be displayable) based on the received EL and BL segments. For example, a requested EL segment may be determined to be timely received if the EL segment is received according to a criterion, which (e.g., when met) may allow the requested EL segment to be decoded and played out (e.g., successfully, without disruption).

According to embodiments, any of a BL and EL segment may comprise one or more encoded frames (e.g., images), sequentially encapsulated in the segment. The frame located at the beginning of the segment (e.g., transmitted/received first) may be referred to herein as the first frame of the segment. The frame located at the end of the segment (e.g., transmitted/received last) may be referred to herein as the last frame of the segment For example, a criterion, upon which an EL segment may be determined as timely received, may be, for example, that data corresponding to the last encoded frame (e.g., image) of the EL segment are (e.g. entirely) received before the decoding time of this frame (e.g., image). The decoding time of a frame may be, for example, the decoding time of the previous frame plus the frame duration. In another example, the criterion may be that data corresponding to all (e.g., each) encoded frames of the EL segment are (e.g. entirely) received before the decoding time of this frame. A decoding time of, for example, the first encoded frame of a segment may be obtained (e.g., determined) by adding a reception time of (e.g., the first bit of) the first encoded frame of the segment to a buffering time. The buffering time may be, for example, greater than or equal to a time transmitted in a manifest together with the bitrate of the segment for characterising the bandwidth properties of the segment as described above.

Any technique for determining a criterion according to which an EL segment is to be (e.g., totally) received for allowing the EL segment to be decoded (e.g., and displayed) without creating any video playout disruption, is compatible with the embodiments described herein.

According to embodiments, if the requested EL segment is timely received, in a step S28, the following (e.g., subsequent) segment of the video in the video timeline may be requested in the form of a BL segment (e.g., encoded) at a second BL bitrate, higher than the first BL bitrate. Indeed, requesting an EL segment corresponding to a same temporal portion of the video as a requested BL segment, but with a priority lower than the BL segment allows to probe the available bandwidth while allowing to improve the video quality from the probing data. Timely receiving a requested EL segment may indicate a bandwidth availability for increasing the bitrate of the next (e.g., subsequent) requested BL segment. If the EL segment is not timely received, for example, not entirely received when the playout of the segment should start, it may be determined that there may not be enough bandwidth available for improving the quality (e.g., increasing the bitrate) of the next (e.g., subsequent) segment, and the next (e.g., subsequent) segment may be requested at the same bitrate as the last requested BL segment (e.g., the first BL bitrate).

According to embodiments, probing for available bandwidth by requesting (e.g., transmitting a packet requesting) an EL segment may be performed with different levels on intensity. For example, probing may be performed at each request transmission for a BL segment. In another example, probing may be regularly performed, by requesting an EL segment every N BL segment request, N being an integer value, for example of any value between two and one hundred. In yet another example, probing may be performed on a regular time basis, for example at expiration of a periodic timer.

In an optional variant, the bitrate for the next (e.g., subsequent) BL segment request is increased on a further condition that more than one successive EL segments are timely received (e.g., received before a playout timeout, received in time to be decoded and rendered). In case of variating (e.g., oscillating) available bandwidth, increasing the bitrate for a subsequent BL segment after having timely received a single EL segment, may impact the user experience. Indeed, increasing the bitrate of subsequent BL segments too aggressively may result in requesting BL segments encoded at a bitrate above the available bandwidth, leading to playout disruptions. Increasing the bitrate of a subsequent BL segment request on the further condition that more than one successive EL segments are timely received (e.g., any number of subsequent EL segments being (e.g., each) received in time to be decoded and rendered) may allow to preserve an ideal video quality despite of oscillating available bandwidth conditions. For example, requesting (and successfully receiving) a BL and an EL for several successive segments before switching to a higher quality BL segment may allow a smooth playback if bandwidth oscillates (e.g., the playback remains uninterrupted, and quality may be enhanced or not at each segment). This may also allow the receiver to converge to the highest possible quality, once bandwidth stabilizes. In yet another variant, the receiver may (e.g., decide to) not decode a received EL segment so as to avoid the video quality to oscillate. The receiver may for example (e.g., decide to) decode an EL segment, after having (e.g., successfully) received a number of successive EL segments. The number of successive EL segments may be e.g., any value between, for example, two and ten.

Figure 3A:
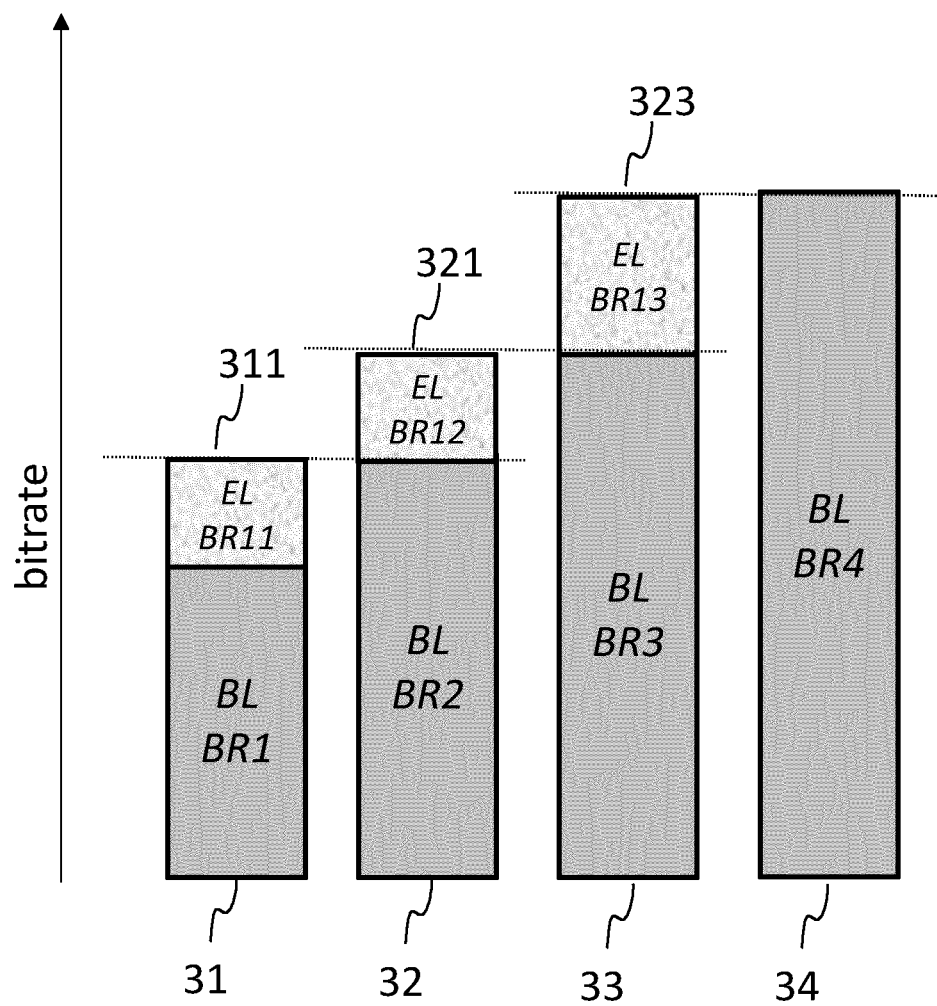
FIG. 3A illustrates an example of an encoding scheme combining scalable and non-scalable features according to an embodiment.

FIG. 3A illustrates an example of an encoding scheme combining scalable and non-scalable features according to an embodiment. In the illustrated example, a same temporal portion of a video may be available as four BL segments 31, 32, 33, 34 encoded at respectively a first BL bitrate BR1, a second BL bitrate BR2, a third BL bitrate BR3 and a fourth BL bitrate BR4. The same temporal portion of the video may be further available as a first 311, a second 321 and a third 323 EL segments, wherein the first EL segment 311 may be an enhancement layer of the first BL segment 31, the second EL segment 321 may be an enhancement layer of the second BL segment 32, and the third EL segment 323 may be an enhancement layer of the third BL segment 33. The first 311, second 321 and third 323 EL segments may be encoded at respectively a first EL bitrate BR11, a second EL bitrate BR12 and a third EL bitrate BR13. According to embodiments, a receiver may request with a given priority the first BL segment 31 encoded at the first bitrate BR1, and with a lower priority the first EL segment 311 encoded at the first EL bitrate BR11. The different bitrate values may be determined so that the sum of the first EL bitrate BR11 and the first BL bitrate BR1 are greater than or equal to the second BL bitrate BR2. The different bitrate values may be further determined, so that the sum of the second EL bitrate BR12 and the second BL bitrate BR2 are greater than or equal to the third BL bitrate BR3, and so that the sum of the third EL bitrate BR13 and the third BL bitrate BR3 are greater than or equal to the fourth BL bitrate BR4. Such an encoding scheme wherein the sum of the bitrates of the BL segment and the EL segment for a same temporal portion is greater than or equal to the (e.g., next) higher level of bitrate that may be requested for a subsequent BL segment, may allow probing for an available bandwidth while receiving (e.g., downloading) the EL layer segment and determining whether the next higher level of bitrate may be (e.g., safely, successfully) requested for a subsequent BL segment (e.g., for being received within the available bandwidth). According to an embodiment, and as illustrated by FIG. 3A, the sums of the bitrates of the BL segment and the EL segment BR1+BR11, BR2+BR12, BR3+BR13 for a same temporal portion may be (e.g., substantially) equal to respectively the (e.g., next) higher level of bitrate BR2, BR3, BR4. By substantially equal, it is meant herein at least within a tolerance of, for example, five percent.

Figure 3B:
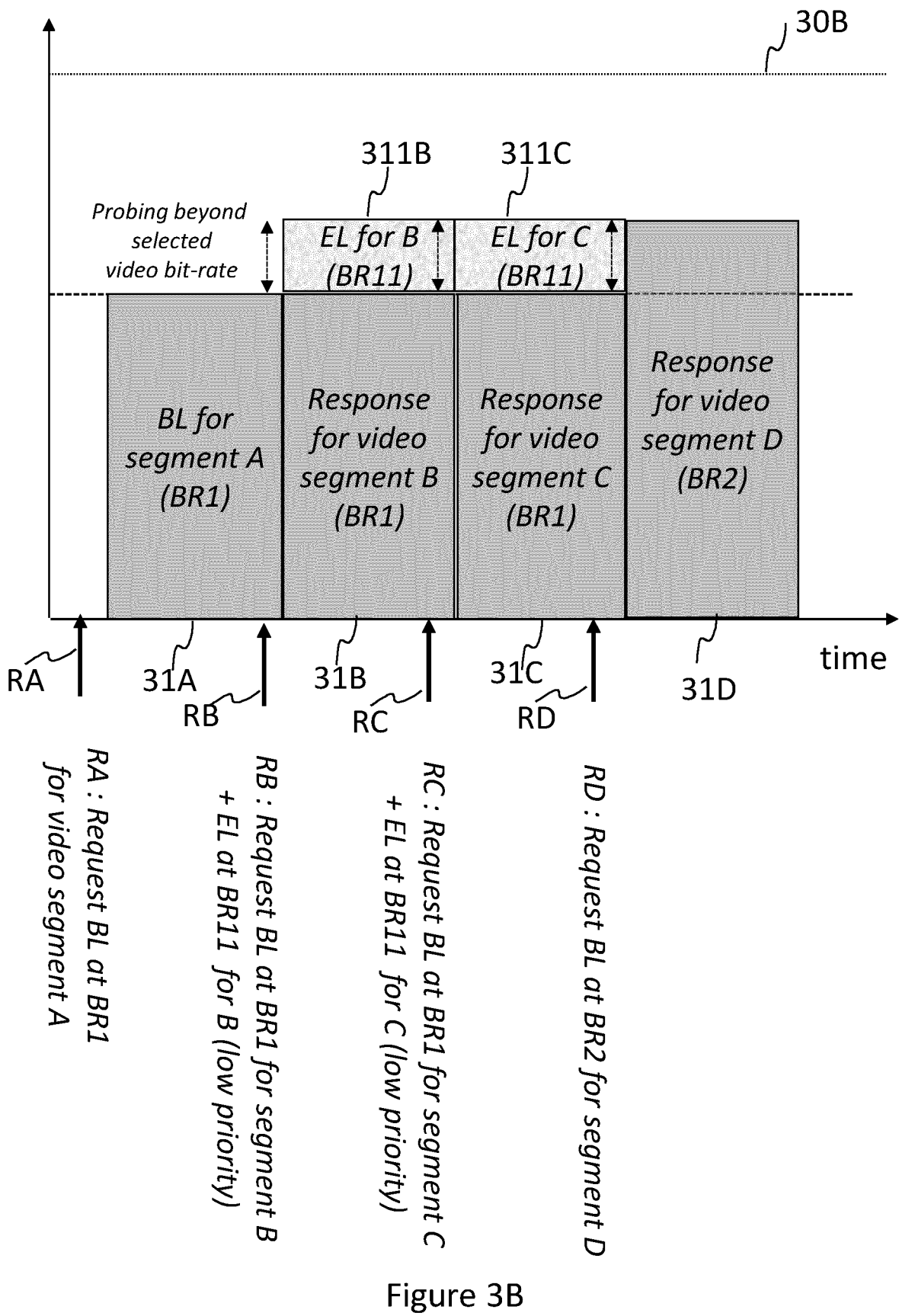
FIG. 3B shows an exemplary sequence of request and response packets illustrating a receiver successfully probing for an available bandwidth according to an embodiment.

FIG. 3B shows an exemplary sequence of request and response packets illustrating a receiver successfully probing for an available bandwidth 30B. According to embodiments, the receiver may transmit a first request packet RA requesting a first BL segment 31A of a first temporal portion A of the video, encoded at a first bitrate BR1. After a time, for example, corresponding to an RTT, the first BL segment 31A for the first temporal portion A may be received. The receiver may transmit a second request packet RB requesting a second BL segment 31B of a second temporal portion B of the video (e.g., subsequent to the temporal portion A), and encoded at the first bitrate BR1. The receiver may also request an EL segment 311B of the second temporal portion B of the video, with a lower priority and encoded at the an EL bitrate BR11 for probing the available bandwidth (e.g., up to BR11). As the sum of the first BL bitrate BR1 and the EL bitrate BR11 is lower than the available bandwidth 30B, both the BL segment 31B and the EL segment 311B may be timely received (e.g., received in time to be decoded and rendered). A further packet RC may be transmitted for requesting (e.g., again) a BL segment 31C of a subsequent temporal portion C of the video encoded at the first BL bitrate BR1, as well as an EL layer segment 311C of the same temporal portion C of the video encoded at the EL bitrate BR11. If the EL segment 311C, transmitted with a lower priority is timely received (e.g., received in time to be decoded and rendered), a request RD for a BL segment 31D of the next temporal portion D of the video at a second BL bitrate BR2 may be transmitted. According to embodiments, the second BL bitrate BR2 may be higher than the first BL bitrate BR1 and lower than or equal to the sum of the first BL bitrate BR1 and the EL bitrate BR11. As the available bandwidth was successfully probed above the second BL bitrate BR2, the BL segment 31D encoded at the second BL bitrate BR2 may be successfully received, decoded and played out.

Figure 3C:
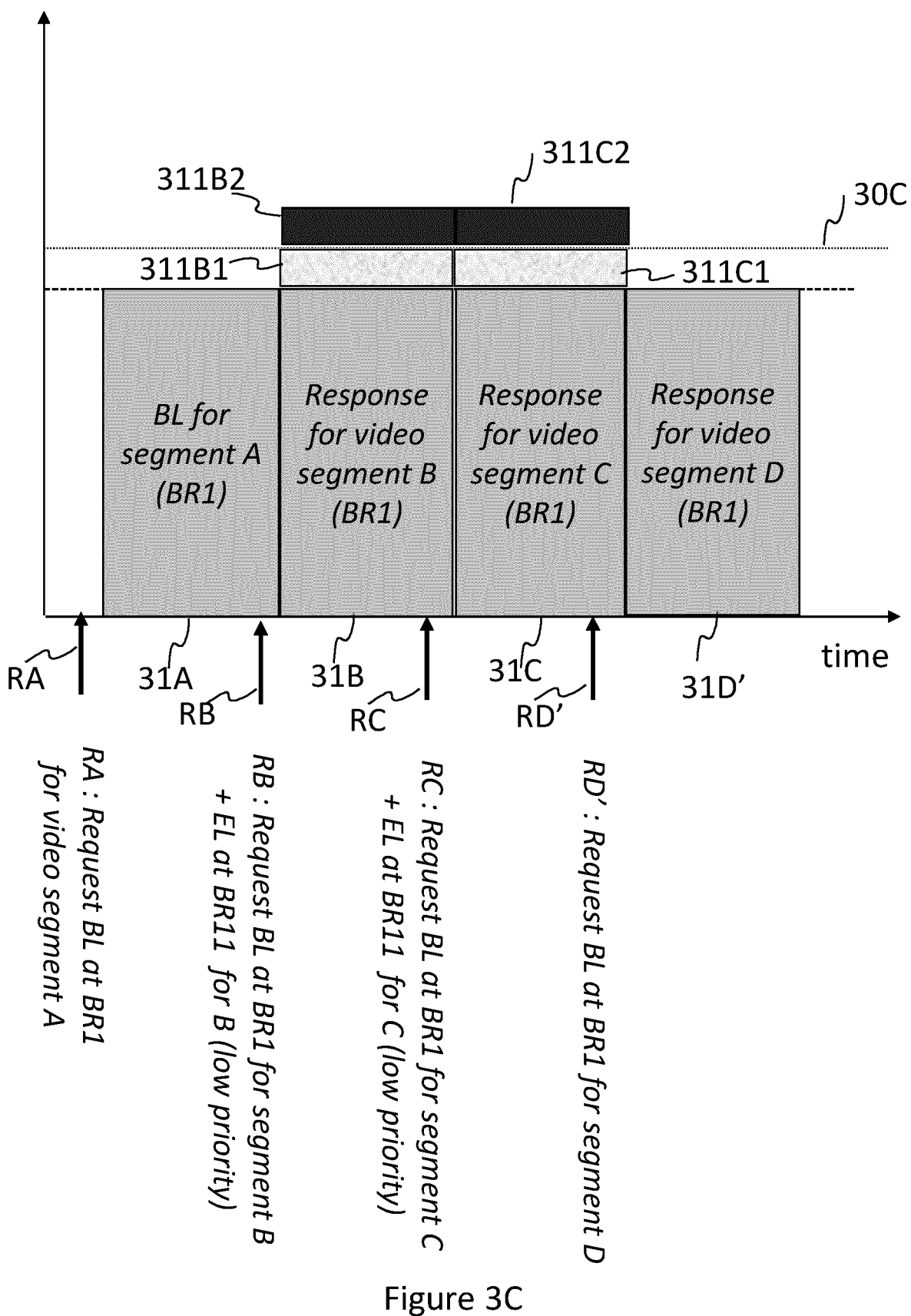
FIG. 3C shows another exemplary sequence of request and response packets illustrating a receiver unsuccessfully probing for an available bandwidth according to an embodiment.

FIG. 3C illustrates another exemplary sequence of request and response packets illustrating a receiver unsuccessfully probing for an available bandwidth 30C according to an embodiment. FIG. 3C shows a similar sequence of packets as FIG. 3B, with the difference that the available bandwidth 30C is lower than the sum of the first BL bitrate BR1 and the EL bitrate BR11. As illustrated by FIG. 3C, only a part 311B1, 311C1 of the EL segments for the corresponding portions of video B, C may be timely received (e.g., before a playout time of the corresponding portion of video), and the receiver may keep the first BL bitrate BR1 for requesting RD' the next BL segment (for the subsequent portion of video D). Only receiving a part 311B1, 311C1 of the EL segments, and missing (e.g., not receiving) a remaining part 311B2, 311C2 of the EL segments (e.g., before a deadline) allows to determine keeping requesting the next BL segment 31D' at the same BL bitrate BR1 (e.g., not increasing the BL bitrate to the next higher level).

Figure 3D:
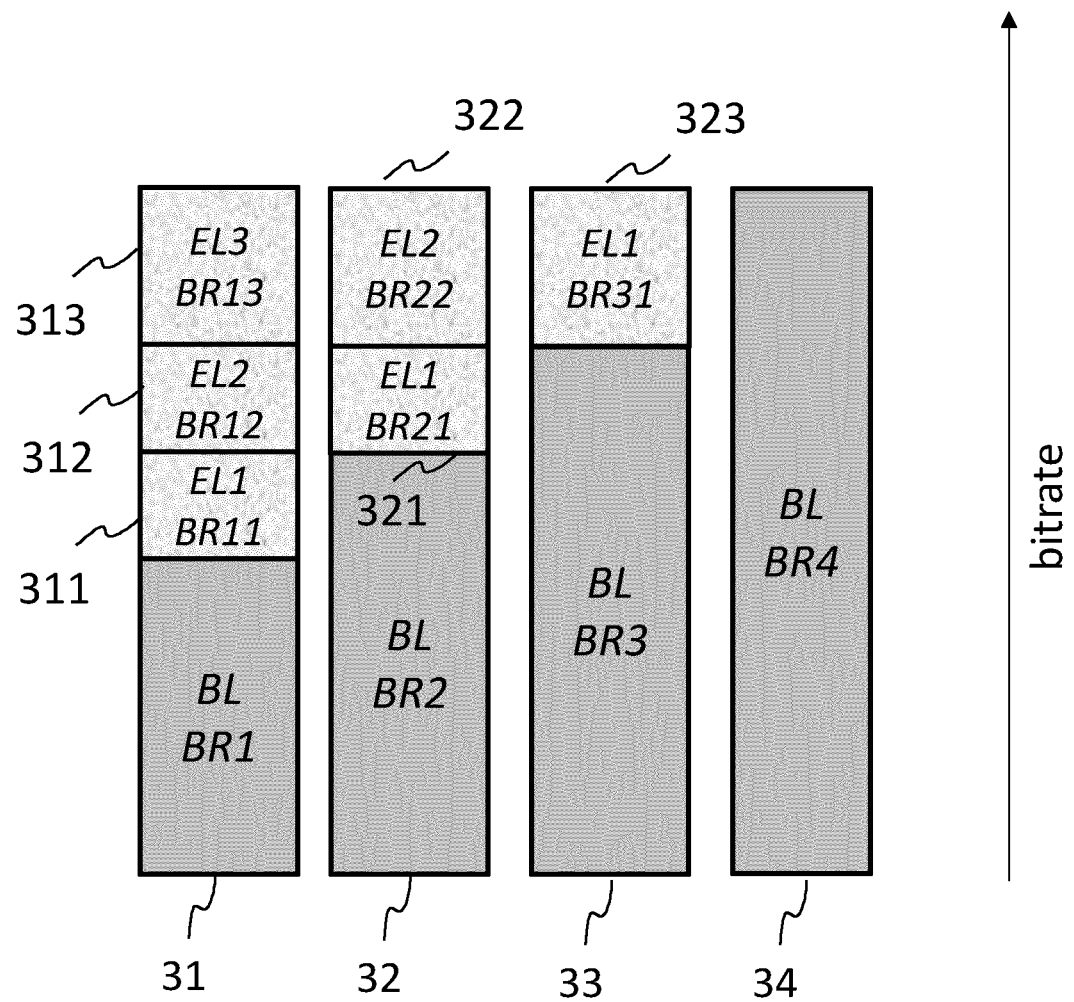
FIG. 3D shows another example of an encoding scheme combining scalable and non-scalable features according to an embodiment.

FIG. 3D shows an example of an encoding scheme combining scalable and non-scalable features according to an embodiment. According to embodiments, multiple enhancement layer EL1, EL2, EL3 segments 311, 312, 313 of a BL segment 31 may be available at respectively a first BR11, a second BR12 and a third BR13 bitrate. Multiple enhancement layer EL1, EL2 segments 321, 322 of a BL segment 32 may also be available at respectively a further first BR21, a second BR22. According to embodiments, multiple enhancement layer segments may be requested with decreasing priorities. By decreasing priorities it is means that the third EL segment 313 may be requested (to be delivered) with a lower priority than the second EL segment 312, which may be requested (to be delivered) with a lower priority than the first EL segment 311, which may be requested (to be delivered) with a lower priority than the BL segment 31.

If a subset of the enhancement layer segments 311, 312, 313 is timely received (e.g., received in time to be decoded and rendered), the BL subsequent segment may be requested at a BL bitrate BR4, lower than or equal to the sum of bitrates of timely received enhancement layer segments and the first base layer bitrate (BR1+BR11+BR12+BR13). Requesting (and timely receiving) multiple enhancement layer segments with decreasing priorities, corresponding to a same temporal portion of the video as the requested BL segment may allow to accelerate to quality improvement, for example at the beginning of an ABR session, or after a sudden available bandwidth increase. Indeed, if, for example, all the three EL segments 311, 312, 313 are timely received together with the BL segment 31, the receiver may directly switch from the first BL bitrate BR1 to the highest BL bitrate BR4 for requesting the next (e.g., subsequent) BL segment. This allows the receiver to stabilize faster to the best possible quality within the available bandwidth.

According to embodiments, multiple EL segments may be applied only to the first segments (e.g., the first minute) of video, the remaining part of the video (e.g., after the first minute) being available as BL and single EL segments. Such a scheme allows to improve the fast start of the receivers, while saving storage space at the server side or in the content delivery network (CDN).

Embodiments disclosed herein allow to render an optimal video quality in steady state (e.g., after the receiver has converged to the best possible BL bitrate), as non-scalable (e.g., AVC) video segments are received rather than scalable video segments, thus avoiding the overheads of the layered approach of scalable coding.

Embodiments disclosed herein allow to improve the quality of the rendered content during the bandwidth estimation, as the content obtained while probing the available bandwidth contributes to improve the rendered quality.

According to embodiments, if bandwidth fluctuates (e.g., wireless condition unstable, competing network connections with bursts such as web browsing), a situation normally addressed through buffering but difficult to solve in low latency contexts (e.g., with small buffers), the receiver may keep requesting segments of video at a BL (e.g., lower) quality with a single EL layer, thus avoiding playback freezes which may be detrimental to user experience, while still allowing to leverage potentially available bandwidth. Keeping requesting a BL segment and a single EL segment (e.g., at each request) allows to always provide the best possible quality for a given (and varying) available bandwidth. As soon as bandwidth stabilizes, switching to (e.g., pure AVC) BL segments allows to further improve the rendered quality (by avoiding the scalable coding overhead).

According to embodiments, a manifest describing information about a video may be received. For example, a manifest may be an MPEG DASH media presentation description (MPD). The manifest may for example include a list of (e.g., all) representations (and e.g., their characteristics) of the video, that may be available to the receiver. Based on the representations (e.g., characteristics), a receiver (e.g., player) may be able to determine which segment may be requested (e.g., to the server). The characteristics of a representation may include any of a (e.g., unique) identifier, a bitrate, a quality level information related to at least one other representation(s), and an information on a (e.g., possible) relationship between (e.g., several) representation(s) (such as e.g., dependency, complementarity, . . . ).

For scalable content, and EL segment may be described via a dependent representation information, indicating (e.g., all the) representation's identifiers from which the EL segment may depend and that may (e.g., need to) be received by the receiver (e.g., player) for decoding and/or display the EL segment.

The (e.g., unique) identifier, bitrate, quality level, relationship information between representation(s) may respectively correspond to the following DASH attributes: @id, @bandwidth, @qualityRanking, @dependancyId. In a MPEG DASH MPD, a @bandwidth attribute for a dependent representation may be the sum of the bitrate of the (e.g., current) representation and the bitrates of (e.g., all) representation(s) from which the (e.g., current) representation may depend. The @dependancyId attribute may be, for example, a whitespace separated list of values of (e.g., unique) identifiers (e.g., @id).

According to embodiments, a receiver, receiving a manifest file describing a video content, may determine, based on the representation characteristics included in the manifest file, the BL and the EL segments to request (e.g., via their corresponding bitrate, (e.g., unique) identifiers, and relationship information between representations (e.g., layer segments).

According to embodiments, a manifest may be transmitted (and/or received) as a (e.g., bitstream) signal comprising:
 a first identifier of a first segment of a video;
 a first information element indicating a first bitrate at which the first segment is encoded;
 a second identifier of a second segment of the video;
 a second information element indicating a second bitrate at which the second segment is encoded;
 a third identifier of a third segment of the video;
 a third information element indicating a third bitrate at which the third segment is encoded;
 a fourth information element indicating a dependency of the second segment to the first segment;
 wherein
  the first segment, the second segment and the third segment correspond to a same temporal portion of the video, and
  the third bitrate is lower than or equal to a sum of the first bitrate and the second bitrate.

According to embodiments, a receiver, receiving a manifest file as, for example, described above, may request a BL segment, for example identified by the first identifier of the manifest. The receiver may determine the EL layer corresponding to the same temporal portion of the video as the requested BL segment, based on the fourth information element of the manifest, indicating a dependency of the second (EL) segment to the first (BL) segment. The receiver may request (e.g., send a packet requesting transmission of) that EL segment for probing the available bandwidth. The receiver may determine which subsequent BL segment to request if the EL segment is timely received. The subsequent BL segment may be determined at least based on its bitrate (being lower than or equal to a sum of the bitrates of the preceding BL and EL segments.)

Figure 4A:
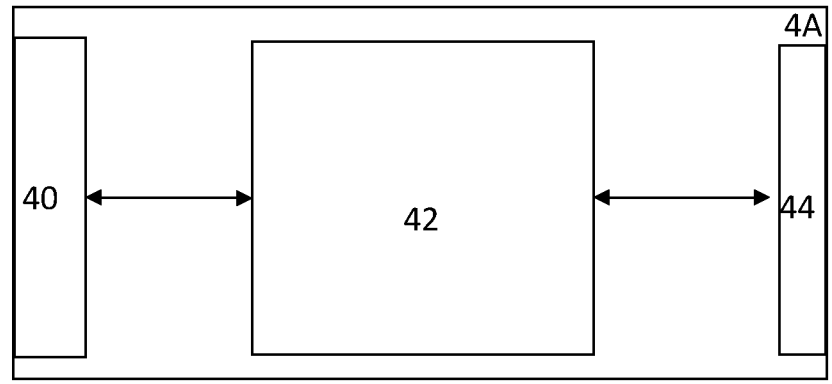
FIG. 4A illustrates a processing device for receiving a video according to an embodiment.

FIG. 4A illustrates a processing device 4A for receiving a video according to an embodiment. The processing device 4A may comprise a network interface 40 for connection to a network, the network interface 40 being configured to send (e.g., transmit) request packets for requesting segments of the video, and to receive response packets comprising the requested segments. According to embodiments, the network interface 40 may be any of:
 a wireless local area network interface such as Bluetooth, Wi-Fi in any flavour, or any kind of wireless interface of the IEEE 802 family of network interfaces;
 a wired LAN interface such as Ethernet, IEEE 802.3 or any wired interface of the IEEE 802 family of network interfaces;
 a wired bus interface such as USB, FireWire, or any kind of wired bus technology.
 a broadband cellular wireless network interface such a 2G/3G/4G/5G cellular wireless network interface compliant to the 3GPP specification in any of its releases;
 a wide area network interface such a xDSL, FFTx or a WiMAX interface.

More generally, any network interface allowing to send and receive data and/or control packets may be compatible with embodiments described herein.

According to embodiments, the network interface 40 may be coupled to a processing module 42, configured to request (e.g., send to the network interface 40 a packet for requesting) a base layer segment encoded at a first base layer bitrate and an enhancement layer segment corresponding to a same temporal portion of the video, the enhancement layer segment being requested to be delivered at a lower priority than the base layer segment. The processing module 42 may be further configured to request a base layer subsequent segment of a subsequent portion of the video, the base layer subsequent segment being requested at a second base layer bitrate, higher than the first base layer bitrate, on a condition that the first enhancement layer segment is timely received (e.g., received in time to be decoded and displayed) on any of the processing device 4A and an external display means coupled to the processing device 4A. According to embodiment, the processing module 42 may be further configured to process (e.g., decode) the received video segments, and to send the decoded video to a video output 44 such as a display means. According to embodiments the display means may be external to the device and the output 44 may send the video to display to an external display means. According to embodiments, the display means, internal or external, may be any of a personal computer screen, a TV screen, a tablet screen, a smartphone screen. More generally any display means allowing to display a video may be compatible with embodiments described herein.

Figure 4B:
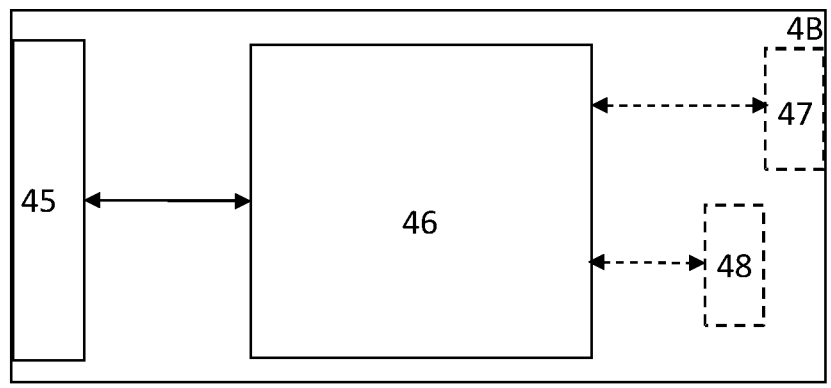
FIG. 4B illustrates a processing device for transmitting a video according to an embodiment.

FIG. 4B illustrates a processing device 4B for transmitting a video according to an embodiment. The processing device 4B may comprise a network interface 45 for connection to a network, the network interface 45 being configured to receive request packets, requesting segments of the video, and to send (e.g., transmit) response packets comprising the requested segments of video. According to embodiments, the network interface 45 may be any of:
 a wireless local area network interface such as Bluetooth, Wi-Fi in any flavour, or any kind of wireless interface of the IEEE 802 family of network interfaces;
 a wired LAN interface such as Ethernet, IEEE 802.3 or any wired interface of the IEEE 802 family of network interfaces;
 a wired bus interface such as USB, FireWire, or any kind of wired bus technology.
 a broadband cellular wireless network interface such a 2G/3G/4G/5G cellular wireless network interface compliant to the 3GPP specification in any of its releases;
 a wide area network interface such a xDSL, FFTx or a WiMAX interface.

More generally, any network interface allowing to send and receive data and/or control packets may be compatible with embodiments described herein.

According to embodiments, the network interface 45 may be coupled to a processing module 46, configured to receive, from the network interface 45, a request for a base layer segment encoded at a first base layer bitrate and for an enhancement layer segment encoded at an enhancement layer bitrate, the base layer segment and the enhancement layer segment corresponding to a same temporal portion of the video. The processing module 46 may be further configured to send to the network interface 45 for transmission the base layer segment and the enhancement layer segment, the enhancement layer segment being transmitted at a lower priority than the base layer segment. The processing module 46 may be further configured, upon receiving a further request for a base layer subsequent segment of a subsequent portion of the video, to send for transmission the base layer subsequent segment encoded at a second base layer bitrate, lower than or equal to a sum of the first base layer bitrate and the enhancement layer bitrate.

According to embodiments, the processing module 46 may be coupled to an optional video encoder 47, configured to encode video segments are different encoded bitrates. The video encoder 47 may be configured to encode any of base layer and enhancement layer segments of any temporal portion of the video according to any embodiments described herein.

According to embodiments, the processing module 46 may be coupled to an optional storage module 48, configured to store video segments encoded at different encoded bitrates. The video encoder may be configured to store any of base layer and enhancement layer segments of any temporal portion of the video according to any embodiments described herein. According to embodiments, the storage module 48 may be internal or external to the processing device 4B. According to embodiments, the storage module 48 may be any non-transitory digital data support, e.g. any of RAM, ROM, EPROM, a SD Card, Hard Disk Drive, CD-ROM, DVD . . . .

Figure 4C:
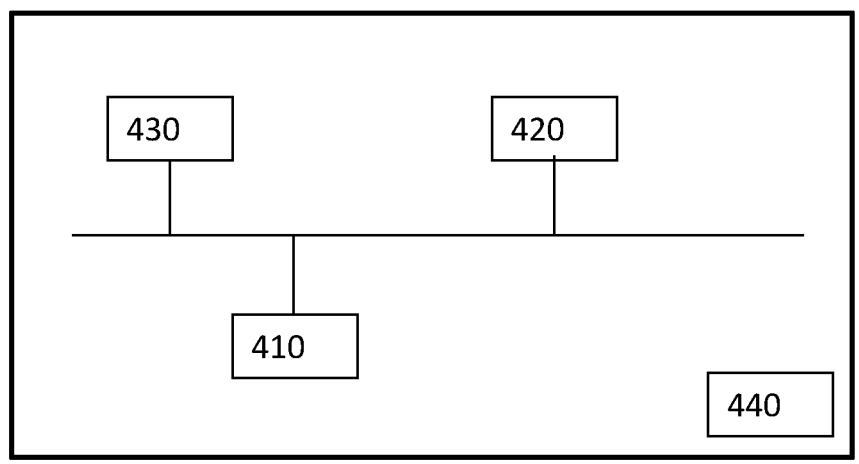
FIG. 4C represents an exemplary architecture of any of the processing devices of FIGS. 4A and 4B according to an embodiment.

FIG. 4C represents an exemplary architecture of the processing devices 4A, 4B described herein, according to an. The processing device 4 4B may comprise one or more processor(s) 410, which may be, for example, any of a CPU, a GPU a DSP (English acronym of Digital Signal Processor), along with internal memory 420 (e.g. any of RAM, ROM, EPROM). The processing device 4A, 4B may comprise any number of Input/Output interface(s) 430 adapted to send output information and/or to allow a user to enter commands and/or data (e.g. any of a keyboard, a mouse, a touchpad, a webcam, a display), and/or to send/receive data over a network interface; and a power source 440 which may be external to the processing device 4A, 4B.

According embodiments, the processing device 4A, 4B may further comprise a computer program stored in the memory 420. The computer program may comprise instructions which, when executed by the processing device 4A, 4B, in particular by the processor(s) 410, make the processing device 4A, 4B carrying out the processing method described with reference to FIG. 2. According to a variant, the computer program may be stored externally to the processing device 4A, 4B on a non-transitory digital data support, e.g. on an external storage medium such as any of a SD Card, HDD, CD-ROM, DVD, a read-only and/or DVD drive, a DVD Read/Write drive, all known in the art. The processing device 4A, 4B may comprise an interface to read the computer program. Further, the processing device 4A, 4B may access any number of Universal Serial Bus (USB)-type storage devices (e.g., "memory sticks.") through corresponding USB ports (not shown).

According to embodiments, the processing device 4A may be any of a set top box device, a TV set, a digital media player/renderer device, an Internet gateway, a mobile device, a communication device, a game device, a tablet (or tablet computer), a smartphone, a laptop computer, a desktop computer.

According to embodiments, the processing device 4B may be any of a (e.g., set of) server (for example of a CDN), a desktop computer, a laptop computer, an access point, wired or wireless, an internet gateway, a router, a laptop computer, a networking device.

In a first aspect, a method for receiving a video is disclosed. The method comprises:

requesting a base layer segment encoded at a first base layer bitrate and an enhancement layer segment corresponding to a same temporal portion of the video, at a lower priority than the base layer segment;

requesting a base layer subsequent segment of a subsequent portion of the video, the base layer subsequent segment being requested at a second base layer bitrate, higher than the first base layer bitrate, on a condition that the first enhancement layer segment is timely received (e.g., received in time to be decoded and rendered).

In another aspect, a method for transmitting a video is disclosed. The method comprises:

receiving a request for a base layer segment encoded at a first base layer bitrate and for an enhancement layer segment encoded at an enhancement layer bitrate, the base layer segment and the enhancement layer segment corresponding to a same temporal portion of the video;

transmitting the base layer segment and the enhancement layer segment, the enhancement layer segment being transmitted at a lower priority than the base layer segment;

upon receiving a further request for a base layer subsequent segment of a subsequent portion of the video, transmitting the base layer subsequent segment encoded at a second base layer bitrate, lower than or equal to a sum of the first base layer bitrate and the enhancement layer bitrate.

In another aspect, an apparatus for receiving a video is disclosed. The apparatus comprises a processor configured to:

request a base layer segment encoded at a first base layer bitrate and an enhancement layer segment corresponding to a same temporal portion of the video, the enhancement layer segment being requested to be delivered at a lower priority than the base layer segment;

request a base layer subsequent segment of a subsequent portion of the video, the base layer subsequent segment being requested at a second base layer bitrate, higher than the first base layer bitrate, on a condition that the first enhancement layer segment is timely received by the apparatus (e.g., received in time to be decoded by the apparatus and to be displayed on any of the apparatus and a display means coupled to the apparatus).

In another aspect, an apparatus for transmitting a video is disclosed. The apparatus comprises a processor configured to:

receive a request for a base layer segment encoded at a first base layer bitrate and for an enhancement layer segment encoded at an enhancement layer bitrate, the base layer segment and the enhancement layer segment corresponding to a same temporal portion of the video;

transmitting the base layer segment and the enhancement layer segment, the enhancement layer segment being transmitted at a lower priority than the base layer segment;

upon receiving a further request for a base layer subsequent segment of a subsequent portion of the video, transmitting the base layer subsequent segment encoded at a second base layer bitrate, lower than or equal to a sum of the first base layer bitrate and the enhancement layer bitrate.

In another aspect, a bitstream signal comprising a video is disclosed. The bitstream signal comprises:

a base layer segment of a video, encoded at a first base layer bitrate, an enhancement layer segment of the video, encoded at an enhancement layer bitrate, the base layer segment and the enhancement layer segment corresponding to a same temporal portion of the video, the enhancement layer segment being adapted to be transmitted at a lower priority than the base layer segment;

a base layer subsequent segment of a subsequent portion of the video, the base layer subsequent segment being encoded at a second base layer bitrate, lower than or equal to a sum of the first base layer bitrate and the enhancement layer bitrate.

In a variant, if the enhancement layer segment is not timely received (e.g., not received in time to be decoded and rendered), the base layer subsequent segment may requested at the first base layer bitrate.

In another variant, the base layer subsequent segment may be requested at the second base layer bitrate on a further condition that more than one successive enhancement layer segment are timely received (e.g., received in time to be decoded and rendered).

In yet another variant, the enhancement layer segment may be encoded at a first enhancement layer bitrate, the sum of the first enhancement layer bitrate and the first base layer bitrate being greater than or equal to the second base layer bitrate.

In yet another variant, the enhancement layer segment may be encoded at a first enhancement layer bitrate, the sum of the first enhancement layer bitrate and the first base layer bitrate being equal to the second base layer bitrate.

In yet another variant, the (any of requesting, transmitting) method further comprises requesting at least one further enhancement layer segment corresponding to the same temporal portion of the video as the base layer segment, the further enhancement layer segment being requested to be delivered at a lower priority than the enhancement layer segment.

In yet another variant, if the at least one further enhancement layer segment is timely received (e.g., received in time to be decoded and rendered), the base layer subsequent segment is requested at a third base layer bitrate, the further enhancement layer segment being encoded at a second enhancement layer bitrate, the sum of the first enhancement layer bitrate, the second enhancement layer bitrate and the first base layer bitrate being greater than or equal to the third base layer bitrate.

In yet another variant, the (any of requesting, transmitting) method further comprises requesting multiple enhancement layer segments corresponding to the same temporal portion of the video as the base layer segment, the enhancement layer segments being requested to be delivered with decreasing priorities In yet another variant, if a subset of the enhancement layer segments is timely received (e.g., received in time to be decoded and rendered), the base layer subsequent segment is requested at a fourth base layer bitrate, the sum of bitrates of timely received enhancement layer segments and the first base layer bitrate being greater than or equal to the fourth base layer bitrate.

In another aspect, a bitstream signal comprising a manifest describing characteristics of video segments of a video is also disclosed. The bitstream signal comprises:

a first identifier of a first segment of the video;
a first information element indicating a first bitrate at which the first segment is encoded;
a second identifier of a second segment of the video;
a second information element indicating a second bitrate at which the second segment is encoded;
a third identifier of a third segment of the video;
a third information element indicating a third bitrate at which the third segment is encoded;
a fourth information element indicating a dependency of the second segment to the first segment;
wherein
the first segment, the second segment and the third segment correspond to a same temporal portion of the video, and
the third bitrate is lower than or equal to a sum of the first bitrate and the second bitrate.

In a variant, the bitstream signal is received and any of the enhancement layer segment and the base layer subsequent segment are determined based on the received bitstream.

In another aspect, a computer program product is also disclosed. The computer program product comprises program code instructions executable by a processor for performing any of the receiving and transmitting methods implemented in any of its variants.

In another aspect, a computer program product for is also disclosed. The computer program product comprises program code instructions executable by a processor for performing any of the receiving and transmitting implemented in any of its variants While not explicitly described, the present embodiments may be employed in any combination or sub-combination. For example, the variants described for the receiving methods and/or apparatus are equally applicable to the transmitting method and/or apparatus, and/or bitstream signals. Embodiments described herein are not limited to the described variants, and any arrangement of variants and embodiments may be used. Moreover, the embodiments described herein are not limited to the described scalable/non-scalable video coding/decoding methods and ABR streaming techniques. Any other type of scalable coding/decoding and/or ABR streaming methods are compatible with the embodiments described herein.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

The invention claimed is:

1. A method comprising:
requesting an initial base layer segment encoded at a first base layer bitrate and an initial enhancement layer segment encoded at a first enhancement layer bitrate, wherein the initial base layer segment and the initial enhancement layer segment correspond to a same temporal portion of a video, and wherein receiving the initial enhancement layer segment is used for probing for available bandwidth;
probing for available bandwidth by determining whether the initial enhancement layer segment is received in time with the initial base layer segment for uninterrupted playout; and
requesting a subsequent base layer segment of a subsequent portion of the video at a second base layer bitrate that is higher than the first base layer bitrate, wherein the second base layer bitrate is less than or equal to a sum of the first enhancement layer bitrate and the first base layer bitrate, wherein the subsequent base layer segment is requested at the second base layer bitrate based on a determination that the initial enhancement layer segment is received with the initial base layer segment for an uninterrupted playout.

2. The method of claim 1, wherein the initial enhancement layer segment is requested to be transmitted at a lower priority than the initial base layer segment.

3. The method of claim 1, wherein the subsequent base layer segment is requested at the second base layer bitrate based on successive determinations that a plurality of successive enhancement layer segments are received with a plurality of successive base layer segments for an uninterrupted playout.

4. The method of claim 1, further comprising:
requesting at least one further enhancement layer segment corresponding to the same temporal portion of the video as the initial base layer segment, the at least one further enhancement layer segment being requested to be delivered at a lower priority than the initial enhancement layer segment.

5. The method of claim 4, wherein the at least one further enhancement layer segment is encoded at a second enhancement layer bitrate, and wherein the second base layer bitrate is less than or equal to a sum of the first enhancement layer bitrate, the second enhancement layer bitrate and the first base layer bitrate.

6. The method of claim 5, wherein the subsequent base layer segment is requested at the second base layer bitrate based on a determination that the at least one further enhancement layer segment is received with the initial base layer segment and the initial enhancement layer segment for an uninterrupted playout.

7. The method of claim 1, wherein the initial enhancement layer segment is received at a lower priority than the initial base layer segment.

8. An apparatus comprising a processor configured to:
request an initial base layer segment encoded at a first base layer bitrate and an initial enhancement layer segment encoded at a first enhancement layer bitrate, wherein the initial base layer segment and the initial enhancement layer segment correspond to a same temporal portion of a video, and wherein a reception of the initial enhancement layer segment is used for probing for available bandwidth;
probe for available bandwidth by determining whether the initial enhancement layer segment is received in time with the initial base layer segment for uninterrupted playout; and
request a subsequent base layer segment of a subsequent portion of the video at a second base layer bitrate that is higher than the first base layer bitrate, wherein the second base layer bitrate is less than or equal to a sum of the first enhancement layer bitrate and the first base layer bitrate, wherein the subsequent base layer segment is requested at the second base layer bitrate based on a determination that the initial enhancement layer segment is received with the initial base layer segment for an uninterrupted playout.

9. The apparatus of claim 8, wherein the initial enhancement layer segment is requested to be transmitted at a lower priority than the initial base layer segment.

10. The apparatus of claim 8, wherein the subsequent base layer segment is requested at the second base layer bitrate based on successive determinations that a plurality of successive enhancement layer segments are received with a plurality of successive base layer segments for an uninterrupted playout.

11. The apparatus of claim 8, wherein at least one further enhancement layer segment corresponding to the same temporal portion of the video as the initial base layer segment is requested to be delivered at a lower priority than the initial enhancement layer segment.

12. The apparatus of claim 11, wherein the at least one further enhancement layer segment is encoded at a second enhancement layer bitrate, and wherein the second base layer bitrate is less than or equal to a sum of the first enhancement layer bitrate, the second enhancement layer bitrate and the first base layer bitrate.

13. The apparatus of claim 12, wherein the subsequent base layer segment is requested at the second base layer bitrate based on a determination that the at least one further enhancement layer segment is received with the initial base layer segment and the initial enhancement layer segment for an uninterrupted playout.

14. The apparatus of claim 8, wherein the initial enhancement layer segment is received at a lower priority than the initial base layer segment.

15. A method comprising:
receiving, from a client device, a request for an initial base layer segment encoded at a first base layer bitrate and for an initial enhancement layer segment encoded at an enhancement layer bitrate, the initial base layer segment and the initial enhancement layer segment corresponding to a same temporal portion of a video;
transmitting the initial base layer segment to the client device;
transmitting the initial enhancement layer segment to the client device for probing for available bandwidth; and
upon receiving a further request from the client device for a subsequent base layer segment of a subsequent portion of the video encoded at a second base layer bitrate, transmitting the subsequent base layer segment encoded at the second base layer bitrate, wherein the second base layer bitrate is higher than the first base layer bitrate and lower than or equal to a sum of the first base layer bitrate and the enhancement layer bitrate, and wherein receiving the further request for the subsequent base layer segment encoded at the second base layer bitrate indicates that the initial enhancement layer segment has been received by the client device with the initial base layer segment for an uninterrupted playout.

16. The method of claim 15, wherein the initial enhancement layer segment is transmitted at a lower priority than the initial base layer segment.

17. An apparatus comprising a processor configured to:
receive, from a client device, a request for an initial base layer segment encoded at a first base layer bitrate and for an initial enhancement layer segment encoded at an enhancement layer bitrate, the initial base layer segment and the initial enhancement layer segment corresponding to a same temporal portion of a video;
transmit the initial base layer segment to the client device;
transmit the initial enhancement layer segment to the client device for probing for available bandwidth; and
upon receiving a further request from the client device for a subsequent base layer segment of a subsequent portion of the video encoded at a second base layer bitrate, transmit the subsequent base layer segment encoded at the second base layer bitrate, wherein the second base layer bitrate is higher than the first base layer bitrate and lower than or equal to a sum of the first base layer bitrate and the enhancement layer bitrate, and wherein receiving the further request for the subsequent base layer segment encoded at the second base layer bitrate indicates that the initial enhancement layer segment has been received by the client device with the initial base layer segment for an uninterrupted playout.

18. The apparatus of claim 17, further comprising an encoder configured to:
   encode the initial base layer segment at the first base layer bitrate;
   encode the initial enhancement layer segment at the enhancement layer bitrate; and
   encode the subsequent base layer segment at the second base layer bitrate.

19. The apparatus of claim 17, further comprising a device configured to:
   store the initial base layer segment encoded at the first base layer bitrate;
   store the initial enhancement layer segment encoded at the enhancement layer bitrate; and
   store the subsequent base layer segment encoded at the second base layer bitrate.

20. The apparatus of claim 17, wherein the initial enhancement layer segment is transmitted at a lower priority than the initial base layer segment.

* * * * *